Figure 1:
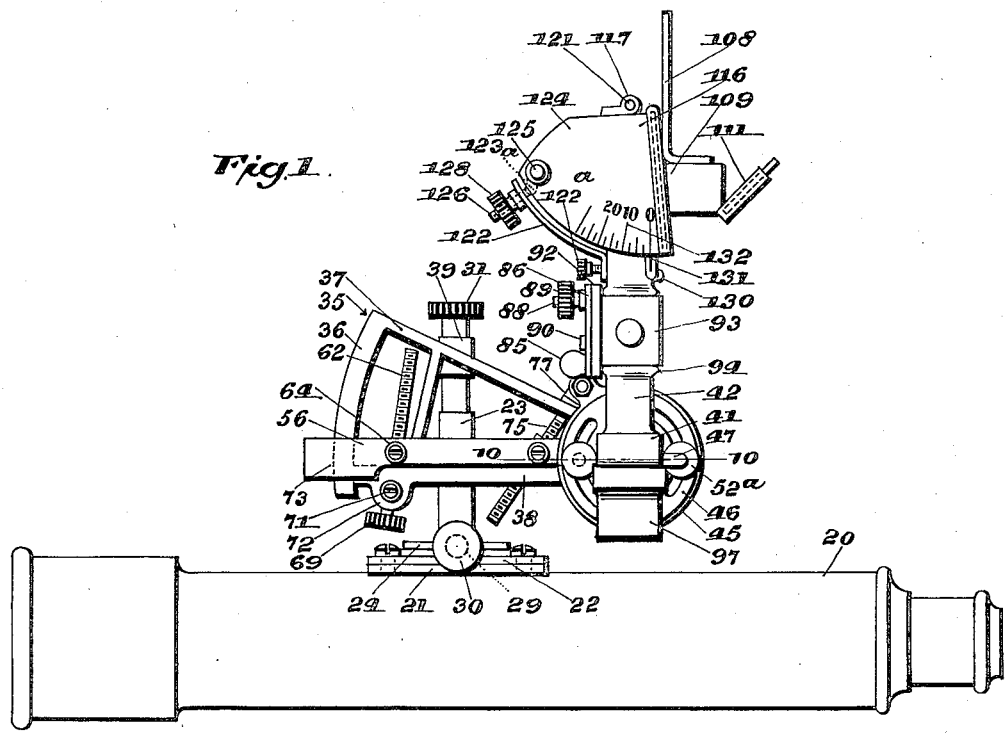

Oct. 26, 1937.   J. M. GUNN   2,097,218
SOLAR ATTACHMENT FOR SURVEYORS' TRANSITS
Filed June 22, 1937   3 Sheets-Sheet 1

Inventor
John M. Gunn
By Munn, Anderson & Liddy
Attorneys

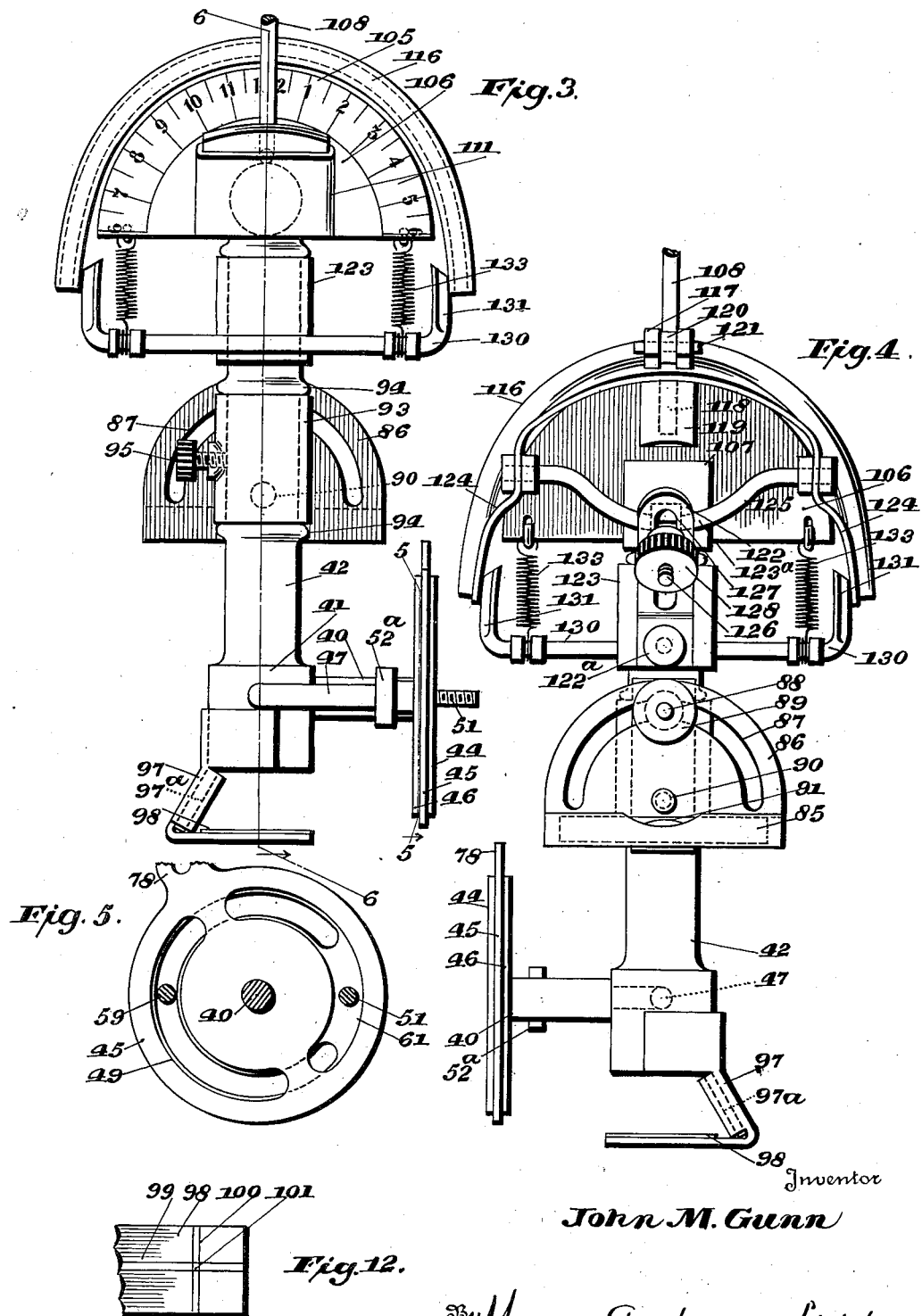

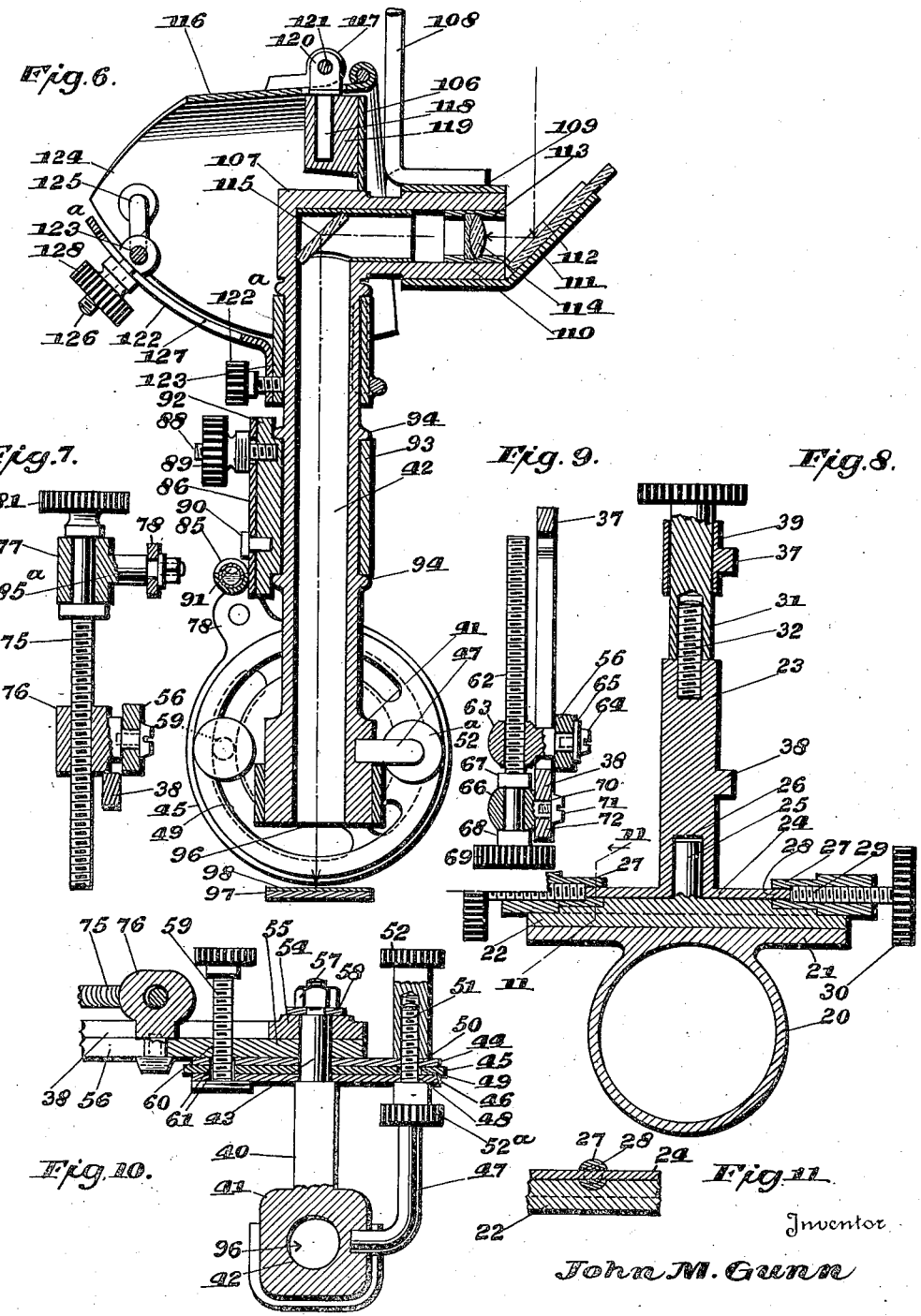

Patented Oct. 26, 1937

2,097,218

UNITED STATES PATENT OFFICE 2,097,218

SOLAR ATTACHMENT FOR SURVEYORS' TRANSITS

John M. Gunn, Albuquerque, N. Mex.

Application June 22, 1937, Serial No. 149,779

12 Claims. (Cl. 33—61)

This invention relates to a solar attachment for a transit.

An object of the invention is the provision of a solar attachment which may be applied to the telescope of a surveyor's transit, and is supported on a transit by a post to which is connected a triangle arc, a telescope being included in the solar attachment and pivotally mounted on the end of the triangle arc in such a manner that the telescope may be fixed in position or may be connected to an oscillating arm moving over a scale on the triangle arc so that the arm will indicate on the scale the angle of declination.

A further object of the invention is the provision of a solar attachment supported on a telescope of a surveyor's transit, the solar attachment including a telescope, a cooperating level and a triangle arc for pivotally mounting the solar telescope, the triangle arc being connected to a post revolvably mounted upon the transit telescope so that the triangle arc may be revolved in a horizontal plane so that during the change of seasons in March and September the whole attachment may be turned on the telescope of the transit in order that the sun's image may be projected upon a plate when the sun has changed its position with respect to the equator and position of the observer.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

Figures 2, 3:
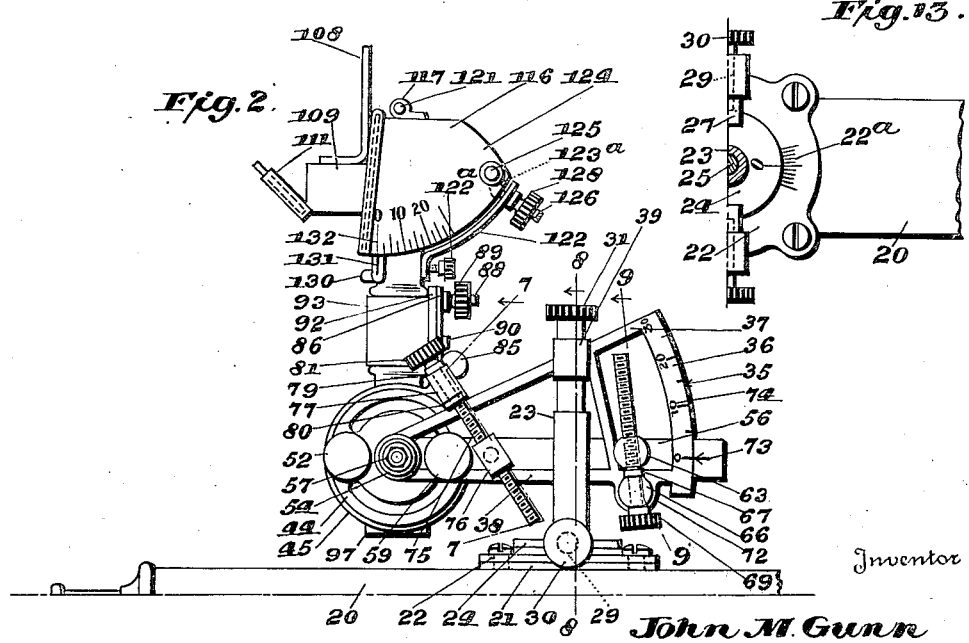

In the drawings:

Figure 1 is a side view showing my solar attachment applied to the telescope of a surveyor's transit, Figure 2 shows a similar view but from the opposite side, Figure 3 is a front end view in elevation of the attachment, Figure 4 shows a rear view in elevation of the attachment, Figure 5 is a section taken along the line 5—5 of Figure 3, Figure 6 is a vertical section taken along the line 6—6 of Figure 3, Figure 7 is a section taken along the line 7—7 of Figure 2, Figure 8 is a vertical section taken along the line 8—8 of Figure 2, Figure 9 is a vertical section taken along the line 9—9 of Figure 2, Figure 10 is a horizontal section taken along the line 10—10 of Figure 1, Figure 11 is a vertical section taken along the line 11—11 of Figure 8, Figure 12 is a detail plan view of the sun-image chart, and Figure 13 is a partially sectional and elevational view particularly showing the solar attachment aligning means.

Referring more particularly to the drawings, 20 designates a telescope of a surveyor's transit upon which is mounted a flange 21 for supporting a solar attachment. A plate 22 is bolted or secured to the flange 21 in any approved manner.

A standard 23 is provided with a circular flange 24 at its lower end and this flange rests upon the plate 22. The plate is provided with a projection 25 which is received within an opening or pocket 26 in the standard 23. Thus it will be seen that the standard 23 may be revolved around a vertical axis with the flange 24 resting upon the plate 22.

The flange is held in place by means of horizontal bearings 27 diametrically located on the plate 22 and these bearings are rigidly secured to said plate. The inner ends of the bearings are kerfed, as shown at 28, to receive the periphery of the circular flange 24. Bolts 29 are threaded into the hollow bearings 27 and finger pieces 30 are adapted to manipulate the bolts so that these bolts when screwed in sufficiently will engage the periphery of the flange 24 and rigidly lock said flange in position against rotation in a horizontal plane.

The standard or post 23 has an extension 31 which is connected in any approved manner to the post, as shown by the bolt 32.

The post or the standard 23 is made sufficiently large and strong to properly support the solar attachment since the entire attachment is carried by this post.

A triangle arc, generally designated by the numeral 35, consists of a scale-bearing arcuately-shaped member 36 and a pair of legs 37 and 38. These legs, as shown more particularly in Fig. 8, are rigidly connected to the post 23 by a sleeve 39 which is secured to the extension 31. The triangle arc is located normally in a vertical plane and is adapted to swing through a horizontal arc by reason of its mounting on the post 23 which is also adapted to be revolved as has been previously explained.

A shaft 40 is secured to a squared portion 41 at the lower end of a barrel 42 of a solar telescope.

This shaft is provided with a reduced portion 43 upon which are mounted three discs 44, 45 and 46, as shown more particularly in Figure 10. A brace rod 47 is secured to the member 41 and is extended substantially parallel to the shaft 40 and passes through perforations 48 in the disc 46 through an arcuately-shaped slot 49 in the disc 45 and through a perforation 50 in the disc 44. The outer free end of the brace rod 47 is threaded, as shown at 51, upon which is screwed a cap nut 52. This construction secures the brace rod 47 to the discs 44 and 46 so that said discs will revolve when the rod 47 is oscillated around the shaft 44 while the disc 45 remains stationary. The nut 52 clamps all of the discs against the shoulder 53 on the brace rod or bar 47. All of the discs it will be noted have a central perforation and revolve on the reduced portion 43 of the shaft 41. This reduced portion also passes through a bearing 54 in the apex of the triangle arc and also passes through a bearing 55 of an arm 56 which oscillates about the shaft 43. A nut 57 clamps a washer 58 onto the bearing 54 so that the three discs, the arm 56 and triangle arc are all bound together.

A bolt 59 is threaded into a passage 60 in the arm 56 and extends through slots 61 in the discs 44 to 46, inclusive.

As shown more particularly in Figs. 2 and 9, a shaft 62 is threaded into a bearing 63 secured to the arm 56. This bearing is swiveled in the arm and held in place by means of a screw 64 and a washer 65. A second bearing 66 receives the shaft 62 and collars 67 and 68 at opposite sides of the bearing 66 maintain the shaft or bolt against reciprocation when it is revolved by the manipulating member 69.

The bearing 66 is supported on a projection 72 formed on the leg 38 of the triangle arc. By manipulating the member 69 the arm 56 is oscillated and the indicator 73 moves over a scale 74 carried by the arcuately-shaped member 36.

A bolt 75 (Figs. 2 and 7) is threaded into a bearing 76 swiveled on the arm 56 and a second bearing 77 is swiveled on a projection 78 of the intermediate disc 45. The bolt on opposite sides of the bearing 77 is provided with collars 79 and 80 and a finger-piece 81 is adapted to revolve the bolt 75 for causing varying positions of said disc relative to the other discs and with respect to the position of the arm 56. The purpose of the adjustment obtained by the tangent bolt 75 will be presently explained.

Referring more particularly to Figs. 3, 4 and 7 it will be seen that a level, generally designed by the numeral 85, is carried by a plate 86 which has a slot 87 to receive a threaded lug 88. A nut 89 is threaded on the bolt for clamping the plate 86 in various positions. The plate is pivotally mounted on a stud 90 which projects through an opening in said plate. By loosening the nut 89 the plate may be rocked on its pivot 90 for changing the position of the level 85 with respect to the vertical so that a bubble 91 will appear in a central position with respect to the level for indicating the horizontal position. The threaded pins or studs 88 and 90 are mounted on a plate 92 which is secured tangentially to a sleeve 93 rotatably mounted on the barrel 42 between shoulders 94. A set screw 95 is adapted to lock the sleeve 93 in an adjusted position.

The barrel 42 is hollow and has an opening at its lower end, as shown at 96, in Fig. 6. A bracket 97 supports a chart 98 directly beneath the opening 96 and is provided with pairs of parallel lines 99 and 100 in which the lines 99 are perpendicular to the lines 100 to provide a square section 101 upon which the image of the sun is adapted to be projected when the instrument has been properly positioned. The lines 100 further indicate substantially the path of the movement of the image of the sun and a meridian which passes through the sun and the equator. The lines 99 represent the solar path with respect to the horizon. A dial 105 (Fig. 3) is carried by a plate 106 rigidly secured to an elbow 107 of the barrel 42. An arm 108 is secured to a sleeve 109 which is rotatably mounted upon an extension 110 of the elbow which is at right angles to the barrel 42. A bracket 111 carries a mirror 112 which is at an acute angle to the vertical and adjacent an opening 113 in the extension 109. The bracket 111 is secured to the sleeve 109 so that when the arm 108 is oscillated to the right or left of the vertical passing through the barrel 43. The mirror will also be oscillated while the arm 108 moves over the scale 105 which represents the hours of the day so that the angular position of the mirror 112 will be indicated by the hours on the scale 105 or vice versa.

The extension 109 carries a compound lens 114 and a prism or mirror 115 is located in the elbow 107 for reflecting light rays from the mirror 112 and the lens combination 114 onto the chart 98. In other words this arrangement throws an image of the sun onto the chart.

A hood 116 is provided with spaced eyes 117. A pin 118 passes through an opening in the top of the hood 116 and extends into a block 119. This pin is provided with an eye 120 which is normally located between the eyes 117 and a wire or pin 121 passes through the aligned eyes for connecting the eyes together and therefore for maintaining the hood in position. This hood is carried by an arm 122 which is secured to a sleeve 123 mounted for rotation on the barrel 42 below the extension 110 on said barrel. A rod 123a is secured to the side walls 124, as shown more particularly in Fig. 4, and this rod has a bowed portion 125 which is secured to a threaded pin 126. The pin extends through a slot 127 in the arm 122 and a nut 128 clamps the pin against the arm 122. A set screw 122a secures the sleeve 123 against rotation.

A rod 130 is secured to the sleeve 123, as shown more particularly in Figs. 3 and 4 and the ends of the rod are turned upwardly, as shown at 131, to provide pointers or indicating fingers which move over scales 132 (Figs. 1 and 2) which are formed on the side walls 124 of the hood 116. Springs 133 are connected between the lower ends of the plate 106 and the rod 130.

It will be noted that the disc 45 is provided with slots 49 through which the bolt or brace rod 47 is adapted to move while the threaded member 59 moves through the slot 61 so that the disc 45 will have independent rotation of the discs 44 and 46. The disc 44 is also provided with a slot 61 through which the member 59 may be moved.

It will be seen from the description that the barrel 42 may be oscillated on its pivot 40 and moved from a vertical position to a substantially horizontal position and its substantially horizontal position is determined by the level 85 so that the barrel may be aligned in parallel relation with the telescope of the transit. The nuts 52 and 57 will hold the telescope in any position desired when said nuts are drawn up tight. The arm 56 may be moved from the zero position to any position up to 30° from the horizontal and the barrel 42 may likewise be moved through such an angle. Thus it will be seen that where the angle of declination is less than 30, the arm 56 may be moved and likewise the barrel 42 through the proper angle so that an image of the sun which is reflected from the mirror 112 will be projected onto the member 98. By properly positioning the telescope this image should fall within the lines 99. Oscillation of the arm 108 will bring the sun's image within the square 101 and the arm also will indicate upon the dial the time of day. However, the correct time may be obtained from a watch and the arm 108 may then be moved to the proper time whence the image should appear directly in the square 101 when the proper declination angle has been previously obtained.

The tangent device, represented by the bolt 75, may be revolved when the nuts 57 and 52 have been screwed up tight for moving the barrel 42 through a predetermined angle or for properly adjusting the barrel after it has been approximately set to the position desired.

The latitude can be taken off the declination arc after the transit has been leveled and the telescope 42 has been brought into correspondence with the telescope of the transit. The adjustable level on the solar attachment is then brought to zero and the solar tube is unclamped and brought down until the adjustable level coincides with that of the telescope of the transit whence the solar tubes are clamped in place.

The arm on the declination arc is adjusted to the proper degree of latitude by means of the threaded bolt 62 and the sun's image should appear somewhere between the lines 99. After the arm has been positioned the adjustable level is moved into place.

It will be noted that the degrees on the triangle arc run from zero to 30. If the latitude is greater than 35 it is necessary to unclamp the solar tube and bring the arm down to zero again. The tubes are then clamped at the angle shown by the adjustable level and the arm is moved up to the required number of dimensions of latitude after which the adjustable level is moved into place.

At the change of seasons in March and September the whole attachment is turned through an arc of 180° on the telescope and the sleeve that carries the adjustable level is also turned through 180° as is the dial and solar arc, after which they are moved into the proper position as indicated by the adjustable level. This is necessary in view of the change in the position of the sun.

The hood 16 actually forms a brace or lever for manipulating the solar arc which marks the path of the sun as it appears in its hourly travel.

Graduations 22a on the member 22 has a zero point which will coincide with a short arc on the telescope of the transit so as to bring the solar attachment in line with the telescope.

I claim:

1. A solar attachment for suveyor's transits comprising a post for mounting on the transit, a triangular frame secured to the post, an indicating arm pivoted on one end of the frame, a telescope pivotally mounted on the pivot of the arm on the frame and movable independently of said arm, said frame having a scale over which the arm moves to indicate the angular displacement of the arm and telescope, a mirror at the upper end of the telescope, means at the other end of said telescope to receive an image of the sun.

2. A solar attachment for surveyor's transits comprising a post for mounting on the transit, a triangular frame secured to the post, an indicating arm pivoted on one end of the frame, a telescope pivotally mounted on the pivot of the arm on the frame and movable independently of said arm, said frame having a scale over which the arm moves to indicate the angular displacement of the arm and telescope, a mirror at the upper end of the telescope, means at the other end of said telescope to receive an image of the sun, and means at the pivotal point of the arm and telescope to secure the telescope in a fixed angular position relative to the horizontal.

3. A solar attachment for surveyor's transits comprising a post for mounting on the transit, a triangular frame secured to the post, an indicating arm pivoted on one end of the frame, a telescope pivotally mounted on the pivot of the arm on the frame and movable independently of said arm, said frame having a scale over which the arm moves to indicate the angular displacement of the arm and telescope, a mirror at the upper end of the telescope, means at the other end of said telescope to receive an image of the sun, means providing for rotation of the post on a vertical axis to permit horizontal swinging of the frame and telescope as a unit.

4. A solar attachment for surveyor's transits comprising a post for mounting on the transit, a triangular frame secured to the post, an indicating arm pivoted on one end of the frame, a telescope pivotally mounted on the pivot of the arm on the frame and movable independently of said arm, said frame having a scale over which the arm moves to indicate the angular displacement of the arm and telescope, a mirror at the upper end of the telescope, means at the other end of said telescope to receive an image of the sun, and means for pivotally mounting the mirror on the upper end of the telescope so that it will revolve around a horizontal axis.

5. A solar attachment for surveyor's transits comprising a post for mounting on the transit, a triangular frame secured to the post, an indicating arm pivoted on one end of the frame, a telescope pivotally mounted on the pivot of the arm on the frame and movable independently of said arm, said frame having a scale over which the arm moves to indicate the angular displacement of the arm and telescope, a mirror at the upper end of the telescope, means at the other end of said telescope to receive an image of the sun, means for pivotally mounting the mirror on the upper end of the telescope so that it will revolve around a horizontal axis, a scale representing the hours of the day mounted at the upper end of the telescope, an arm acting as an indicator movable over the scale and connected with the mirror for revolving said mirror, the arm and scale cooperating to properly position the mirror with respect to the position of the sun.

6. A solar attachment for surveyor's transits comprising a post for mounting on the transit, a triangular frame secured to the post, an indicating arm pivoted on one end of the frame, a telescope pivotally mounted on the pivot of the arm on the frame and movable independently of said arm, said frame having a scale over which the arm moves to indicate the angular displacement of the arm and telescope, a mirror at the upper end of the telescope, means at the other end of said telescope to receive an image of the sun, means for causing oscillation of the arm of the frame and for retaining said arm in a fixed angular position.

7. A solar attachment for surveyor's transits comprising a post for mounting on the transit, a triangular frame secured to the post, an indicating arm pivoted on one end of the frame, a telescope pivotally mounted on the pivot of the arm on the frame and movable independently of said arm, said frame having a scale over which the arm moves to indicate the angular displacement of the arm and telescope, a mirror at the upper end of the telescope, means at the other end of said telescope to receive an image of the sun, a level mounted on the telescope and adjustable to various positions with respect to the vertical axis of the telescope.

8. A solar attachment for surveyor's transits comprising a post mounted for rotation on the transit, a frame secured to the post, a solar telescope having a stub shaft rotatably mounted in one end of the frame whereby the telescope may be swung from a vertical to a horizontal position, a pair of discs mounted for rotation on the shaft, means connecting the discs with the telescope for simultaneous oscillation with said telescope, a disc mounted for oscillation between the first-mentioned discs, adjustable means for retaining the last-mentioned disc in a predetermined position, and means for clamping all of the discs together for securing the solar telescope in a predetermined position, angular adjustment of the last-mentioned disc causing angular adjustment of the solar telescope.

9. A solar attachment for surveyor's transits comprising a post mounted for rotation on the transit, a frame secured to the post, a solar telescope having a stub shaft rotatably mounted in one end of the frame whereby the telescope may be swung from a vertical to a horizontal position, a pair of discs mounted for rotation on the shaft, means connecting the discs with the telescope for simultaneous oscillation with said telescope, a disc mounted for oscillation between the first-mentioned discs, adjustable means for retaining the last-mentioned disc in a predetermined position, means for clamping all of the discs together for securing the solar telescope in a predetermined position, angular adjustment of the last-mentioned disc causing angular adjustment of the solar telescope, and means for adjustably positioning the post when revolved on a vertical axis.

10. A solar attachment for surveyor's transits comprising a post mounted for rotation on the top of the transit telescope, a frame secured to the post, a solar telescope pivoted to one end of the frame and movable from a vertical to a horizontal position, means for clamping the solar telescope in a predetermined angular position, said frame provided with a scale defining the angular position of the solar telescope, an indicating arm for pointing out the angular deviation of the solar telescope, and means connecting the arm with said telescope.

11. A solar attachment for surveyor's transits comprising a post mounted for rotation on the top of the transit telescope, a frame secured to the post, a solar telescope pivoted to one end of the frame and movable from a vertical to a horizontal position, means for clamping the solar telescope in a predetermined angular position, said frame provided with a scale defining the angular position of the solar telescope, an indicating arm for pointing out the angular deviation of the solar telescope, means connecting the arm with said telescope, the last-mentioned means including means for causing angular movement of the arm and simultaneous movement of the solar telescope.

12. A solar attachment for surveyor's transits comprising a post mounted for rotation on the top of the transit telescope, a frame secured to the post, a solar telescope pivoted to one end of the frame and movable from a vertical to a horizontal position, means for clamping the solar telescope in a predetermined angular position, said frame provided with a scale defining the angular position of the solar telescope, an indicating arm for pointing out the angular deviation of the solar telescope, means for adjustably positioning and for retaining the arm in its adjusted position, a disc mounted for rotation on the pivot of the solar telescope, means connected between the disc and the arm for angularly adjusting the position of the disc, and means for connecting the solar telescope to the disc whereby adjustment of the disc will cause angular displacement of the solar telescope.

JOHN M. GUNN.